United States Patent [19]
Hofgen et al.

[11] 3,887,922
[45] June 3, 1975

[54] INSTRUMENT LANDING SYSTEM WITH MICROWAVE COURSE PATTERN TRANSMISSION

[75] Inventors: Günter Hofgen; Werner Poschadel, both of Kornwestheim, Germany

[73] Assignee: International Standard Electric Corp., New York, N.Y.

[22] Filed: Jan. 23, 1974

[21] Appl. No.: 435,654

[52] U.S. Cl. ............................. 343/108 R; 343/109
[51] Int. Cl. .............................................. G01s 1/16
[58] Field of Search ......................... 343/108 R, 109

[56] References Cited
UNITED STATES PATENTS
2,993,665   7/1961   Carpenter ...................... 343/108 R
3,305,866   2/1967   Earp ................................... 343/109
3,482,247   12/1969  Thompson ........................ 343/109

*Primary Examiner*—Maynard R. Wilbur
*Assistant Examiner*—T. M. Blum
*Attorney, Agent, or Firm*—William T. O'Neil

[57] ABSTRACT

A combined microwave and standard ILS system. Course information for at least one of the localizer and glide-slope functions is transmitted in the microwave frequency region, down-converted in the air and mixed into the clearance channels where it overrides standard clearance signals in substantially the same way as with standard ILS course signals on a landing approach. The system is compatible with existing airborne ILS equipment.

3 Claims, 3 Drawing Figures

INSTRUMENT LANDING SYSTEM WITH MICROWAVE COURSE PATTERN TRANSMISSION

BACKGROUND OF THE INVENTION

1. Field of the Invention

The invention relates to Radio Instrument Systems for Aircraft Landing, particularly of the so-called ILS type.

2. Description of the Prior Art

To make landings in accordance with Instrument Flight Rules (IFR), use is generally made of the so-called Instrument Landing System (ILS). On the ground, this system consists of a localizer for guiding the aircraft in the horizontal plane, a glide slope for guiding the aircraft in the vertical plane, and two or three marker beacons indicating the position of the aircraft with respect to the runway.

Single-carrier installations, which operate all data on one carrier frequency, and two-carrier installations, which radiate, in addition to the first carrier frequency, a second carrier frequency shifted by 9 kHz, are known in the art. Such a two-carrier installation is described in an article by W. Feyer and H. Voss, entitled "Die Landekursanlage LK2", published in the journal "Luftfahrttechnik, Raumfahrttechnik", No. 4, 1963.

In that installation, one carrier frequency serves to radiate the sharply defined, so-called "course pattern"; the other carrier frequency serves to radiate a so-called "clearance pattern", which is effective outside (over a wider area than) the course pattern. In that installation, distortions caused by multipath reflections may occur in the localizer course if reflecting objects are situated in a sector of ±10° of the course radiation (angles defined with respect to the runway center line). In the case of the glide slope, the reflection from the ground is utilized to generate the vertical patterns. Therefore, a relatively long stretch of level terrain in the direction of the approaching aircraft is necessary. Buildings, trees, or terrain variations in this area result in stepped distortions of the radiation pattern.

Instrument landing systems are known which operate completely in the microwave region. Such a system is described in the journal "Interavia", No. 2, 1972, p. 128. In those systems there are virtually no reflections. However, their use is limited to special cases because existing aircraft which do not have the necessary additional equipment cannot land at airports equipped with such a landing installation. Thus, the system is not compatible with existing ILS installations and, therefore, is unsuitable for civil aviation.

The manner in which the present invention deals with the problems aforementioned will be understood as this description proceeds.

SUMMARY OF THE INVENTION

The general object of the invention is to provide a two-carrier instrument landing system in which the signals radiated from the ground station can be processed by both standard airborne ILS receivers now in use, while achieving the advantages of microwave ILS for aircraft equipped according to the invention.

The novel system combines the advantages of the known all-microwave system and of the standard ILS. The course radiation is in the microwave region and is independent, therefore independent of the distortions encountered in prior art ILS due to multipath propagation. Ground and airborne equipment for microwave clearance is not necessary because clearance is adequately provided by the standard ILS. In addition, the novel system permits an aircraft to make a landing using basic prior art ILS equipment even if it is not equipped with the additional receiving equipment for receiving microwave course radiation on board.

The system of the invention begins with the arrangement of a two-carrier ILS system. Localizer and glide-slope transmitting means are provided, each of which generates a clearance and a guidance (course) pattern. The localizer typically transmits in the 108 to 112 MHz range for the clearance function and the glide-slope clearance transmitting frequency is typically in the 328 to 336 MHz range. Deviations from the course line or prescribed glide-slope angle are determined at the airborne receiver by comparison of the 90Hz and 150 Hz modulation in the lobes of the radiation pattern. According to the invention, at least one of the two course (localizer and/or glide slope) radiation patterns is generated in the microwave region, typically 5110 MHz + 9 KHz for the localizer course and/or 5330 MHz + 8 KHz for the glide-slope. The airborne receiver has associated with it, means for down-converting that microwave signal to the lower frequency channel of the corresponding standard ILS reception frequency for that function. Thus, the more accurate microwave course patterns are substituted for the conventional "precision" (course) ILS beams.

BRIEF DESCRIPTION OF THE DRAWINGS

The invention will be explained in detail and by way of example with reference to the accompanying drawings, in which.

DESCRIPTION OF THE PREFERRED EMBODIMENT

Since, in the instrument landing system, the localizer and glide-slope stations are largely identical except for the transmitting frequencies and antenna arrangements, it is sufficient to explain the invention only with reference to the localizer stations. The following description applies analogously to the glide-slope station.

Figure 1:
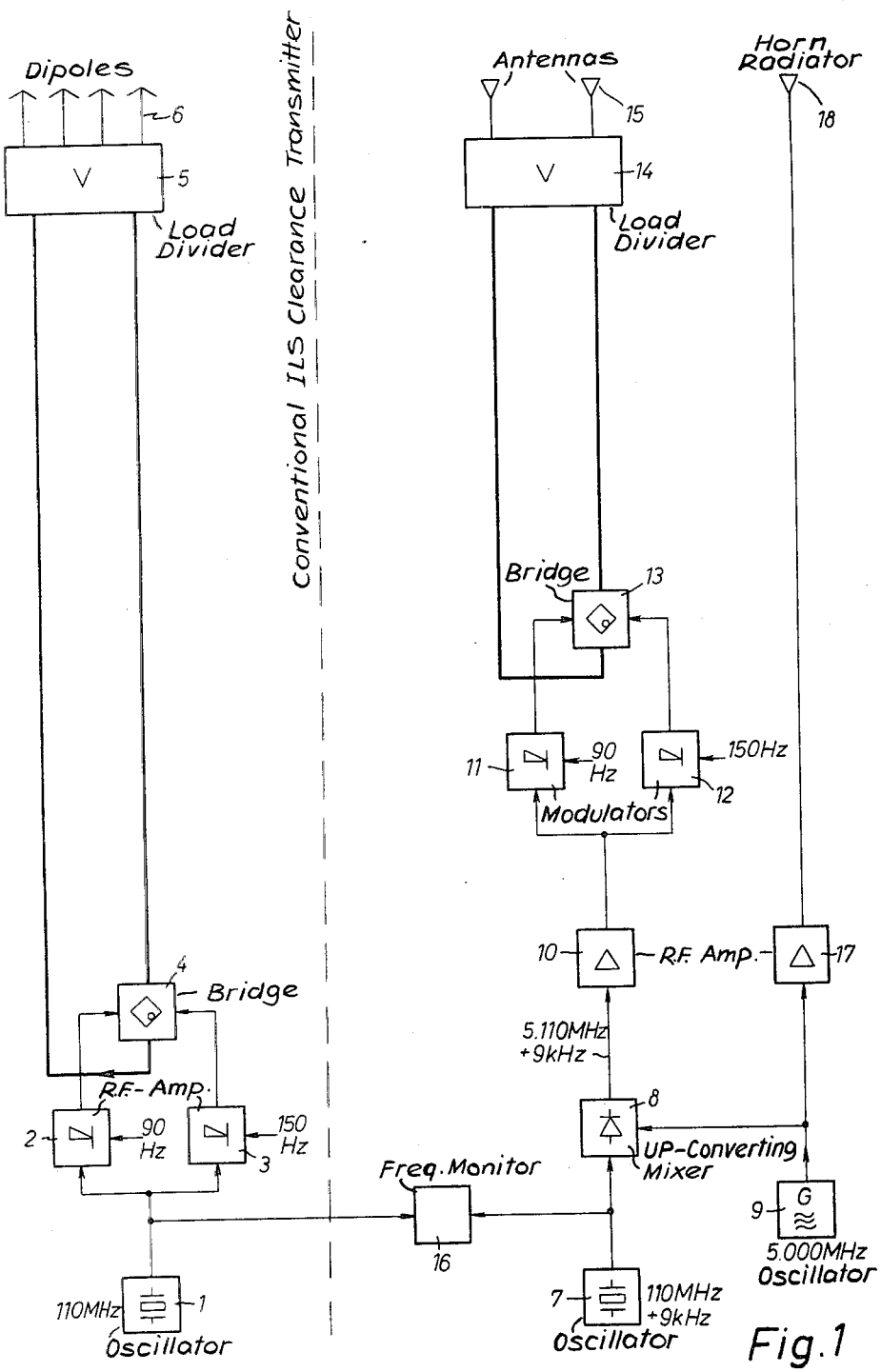
FIG. 1 is a block diagram of a localizer station consisting of a conventional clearance transmitter and the novel course transmitter.

The conventional clearance transmitter of the localizer station with the associated antenna is shown on the left of FIG. 1. The transmitter contains an oscillator 1 for generating the carrier frequency in the range from 108 to 112 MHz. It is assumed that 110 MHz are generated. The carrier frequency is amplitude-modulated in two transmitter R.F. amp. stages 2 and 3 with 90 Hz and 150 Hz, respectively. In a following bridge 4, the sum and the difference are formed from the two voltages of the transmitter stages. Via a load divider 5, dipoles 6 are fed with the output voltages of the bridge 4 in such a manner that a directional carrier pattern and directional sideband patterns are obtained whose superpositions result in the desired directional modulation pattern. Instead of the antenna with four dipoles, shown in FIG. 1, an antenna with more dipoles and larger directivity may be used.

Following is a description of the novel course transmitter with operating frequency in the microwave region; it is shown on the right side of FIG. 1. It radiates the coarse information within a narrow range, preferably about ±1° to 2° around the runway centerline.

An oscillator 7 generates a frequency of 110 MHz + 9 KHz, which is necessary in two-carrier systems and is shifted by 9 KHz with respect to the frequency of the oscillator 1.

In an up-converting mixer 8, this frequency of 110 MHz + 9 KHz is mixed with the frequency of an oscillator 9, which is 5,000 MHz. The frequency generated in this way is applied through a CW RF amplifier 10 to two modulators 11 and 12 with pin diodes, which amplitude-modulate the frequency of 5,110 MHz + 9 KHz with 90 Hz and 150 Hz.

The two modulated voltages are applied to a bridge 13 (3-dB hybrid) at whose two outputs the sum and the difference of the voltages are available discretely. Sum and difference voltages are applied to a load divider 14, to which two antennas 15 are connected. If these antennas are horn radiators as shown, the load divider 14 may be a hybrid ring.

For the clearance transmitter and the course transmitter, common 90—Hz and 150—Hz modulating-voltage generators are provided, which are not shown in FIG. 1.

The frequency separation of 9 KHz between the two VHF oscillators 1 and 7, which is necessary for utilization of capture effect in the airborne receiver, is continuously monitored by a frequency monitor 16.

Figure 2:
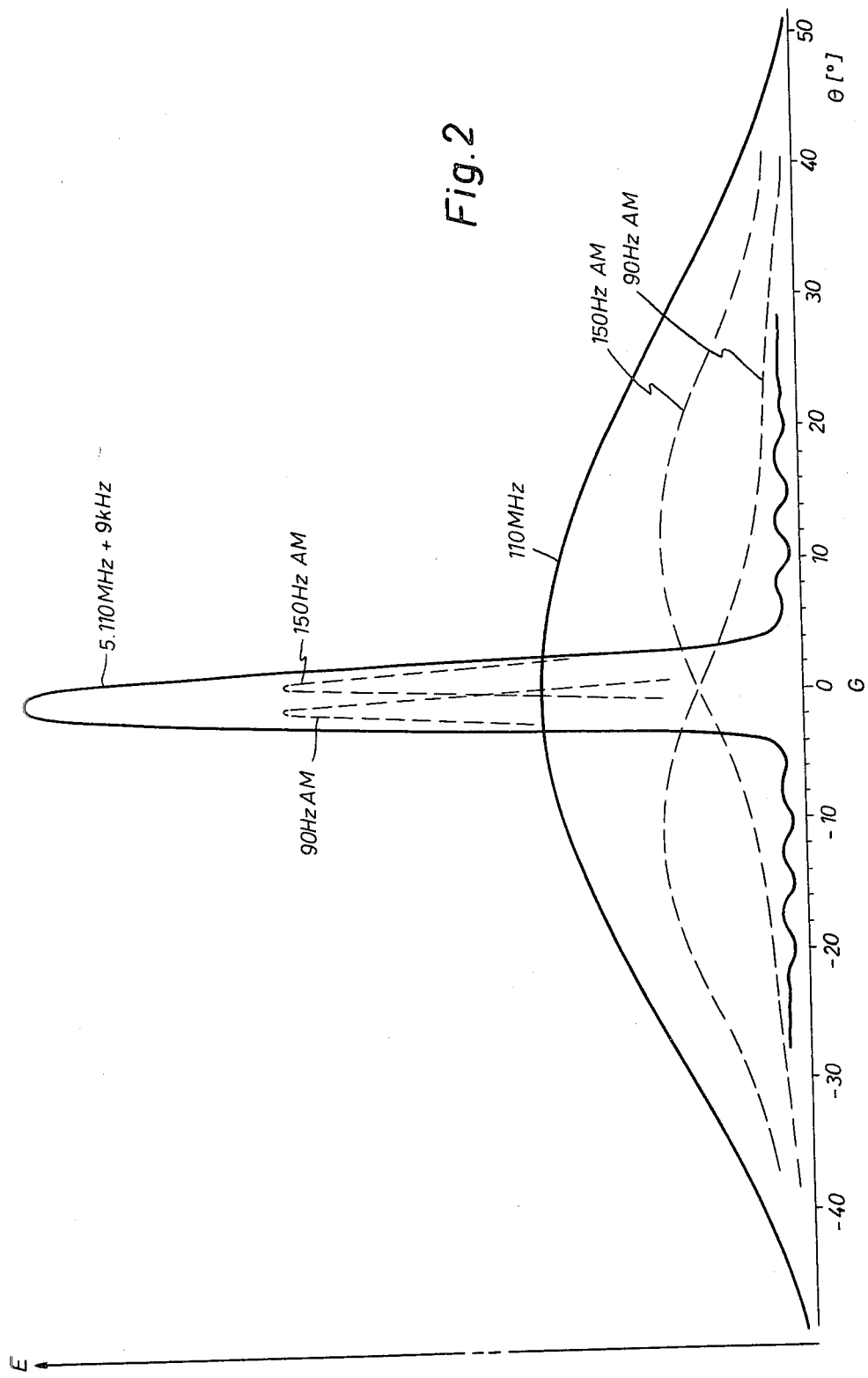
FIG. 2 shows the horizontal radiation patterns of the station of FIG. 1.

FIG. 2 shows a typical distribution of field strength E in the horizontal plane as is obtained with the transmitter and antenna arrangements described. The associated modulation pattern on both sides of the runway center line G as a function of the azimuth $\theta$ is also illustrated.

Particularly advantageously, the oscillator 9 (FIG. 1), which is necessary for upward mixing, is also utilized by radiating its output signal via an additional horn radiator 18 after power amplification in a CW RF amplifier 17. Alternatively, however, that radiation may be effected via the horn radiators 15. It is used aboard the aircraft as a reference local oscillator for the downward mixing (down-conversion) of the microwave frequency.

Figure 3:
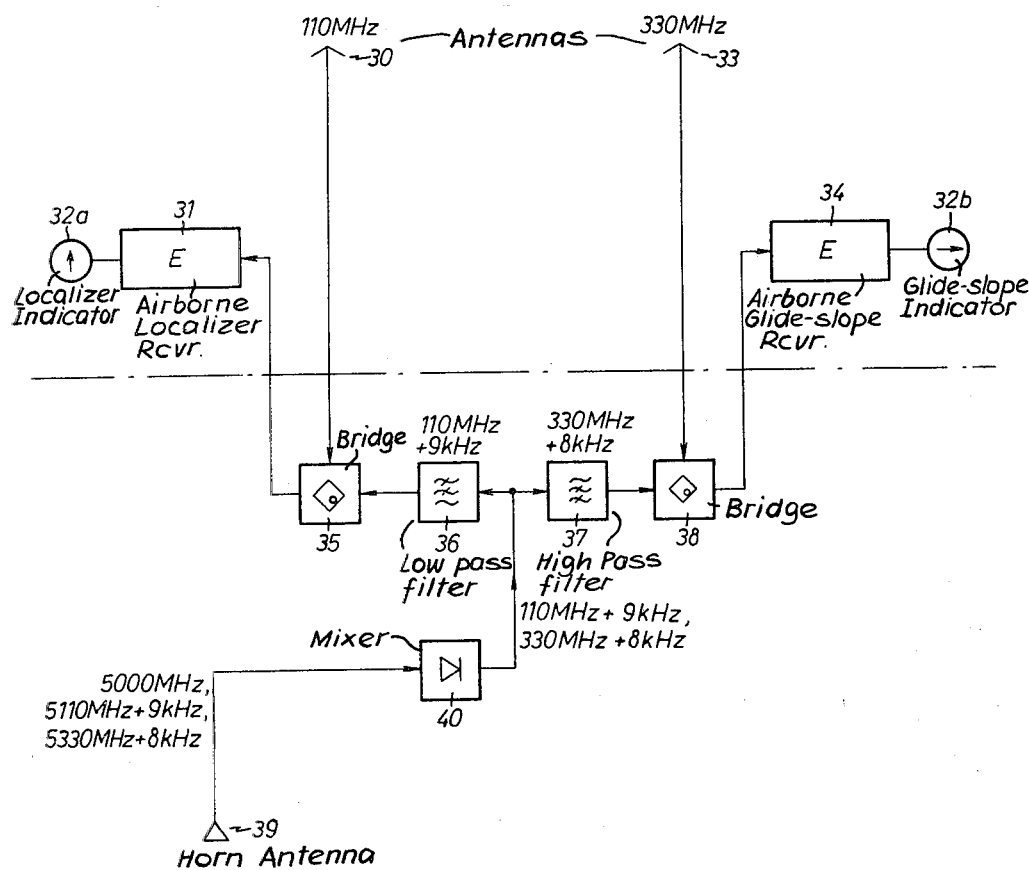
FIG. 3 is a block diagram of the additional airborne equipment and its connection to the conventional ILS airborne equipment.

FIG. 3 shows, in the upper half, the conventional ILS airborne sets 31 and 34 for receiving the localizer and glide-slope signals, respectively. The VHF airborne antenna is designated 30, and the UHF airborne antenna 33, and 32a and 32b, respectively, are the associated parts of the crosspointer instrument commonly used in ILS systems.

The lower half of FIG. 3 shows the additional equipment for receiving and converting the microwave radiation according to the system of the invention. A horn antenna 39 receives three different frequencies, namely the oscillator frequency of 5,000 MHz, radiated by the horn radiator 18 (FIG. 1), the course radiation of the localizer of 5,110 MHz + 9 KHz, radiated by the horn radiators 15, and if used at the time, the course radiation of the glide slope of 5,330 MHz + 8 KHz. The frequencies are applied to a mixer 40 which contains a tunnel diode or point-contact diode and at whose output appear the course signals, converted to VHF and UHF. On the one hand, these signals are applied via a low-pass filter 36 to a bridge 35 to whose other input the VHF antenna 30 is connected. The output of the bridge 35 is connected to the input of the aircraft's normal localizer receiver 31. On the other hand, the output signals of the mixer 40 are also applied via a high-pass filter 37 to a bridge 38, to whose other input the UHF antenna 33 is connected. The output of the bridge 38 is connected to the input of the aircraft's normal glide-slope receiver 34.

To explain the operation of the invention, all cases, i.e., transmitting stations at the ground and the airborne receivers containing the novel equipment or not, there are three cases, as follows:

a. An aircraft having the novel additional equipment proposing to land at an airport equipped with a conventional ILS facility. In this case, the additional equipment is ineffective. All signals are received by the VHF and UHF antennas. During the approach, in general, the aircraft is first within the coverage of the clearance. As soon as the aircraft moves into the range of the course radiation, the high field strength of this radiation causes the clearance, which has a frequency separation of only 9 KHz, to be suppressed, so that only the course radiation is effective alone (so-called capture effect). This is possible because the receivers have a bandwidth of about 20 KHz.

b. An aircraft without the novel additonal equipment proposing to land at an airport equipped with the novel ILS facility according to the invention. In this case, the receivers evaluate the clearance signals in the long and short ranges. A relatively good landing is possible because the clearance has the properties of standard single-carrier facilities.

c. An aircraft with additional equipment proposing to land at an airport equipped with the novel ILS facility. In this case, the capture effect occurs as it does during an approach with a conventional two-carrier ILS system. This is because the quality of the microwave course radiation, unaffected by reflections, making landings possible up to category III (according to ICAO definition).

What is claimed is:

1. An instrument landing system of the two-carrier type including ground based localizer and glide-slope signal transmitting means, each generating a clearance radiation pattern and a course radiation pattern, the carrier frequencies for said localizer and glide-slope clearance patterns being in the VHF and UHF regions, respectively; said system including an airborne receiver for determining deviations from a desired landing path by comparison of relative amplitudes of 90Hz and 150Hz modulation on a carrier, comprising the combination of:

ground means for generating and radiating a course radiation pattern for at least one of said localizer and glide-slope functions in the microwave frequency region;

and airborne means including a microwave receiving antenna and a converter responsive thereto for converting said microwave radiation into the frequency domain of the corresponding clearance channel, and also including means for mixing said converted microwave radiation with corresponding lower carrier frequency received clearance radiation, thereby to provide for a capture effect such that said airborne means will automatically respond to ground radiations with or without said microwave radiation.

2. Apparatus according to claim 1 comprising an oscillator within said ground based transmitting means, and means for transmitting a microwave signal to said converter in said airborne receiver as a local oscillator signal, thereby to provide a ground generated frequency reference for said airborne receiver.

3. Apparatus according to claim 1 in which said localizer clearance transmitting frequency is in the range from 108 to 112 MHz, the transmitting frequency for said glide-slope clearance is in the range from 328 to 336 MHz, said microwave frequency is in the region of 5110 MHz + 9 KHz for localizer course transmission and 5330 MHz + 8 KHz for glide-slope course transmission;

and the down-converted course frequencies in said airborne receiver are 110 MHz + 9 KHz for localizer pattern reception and 330 MHz + 8 KHz for glide-slope, said airborne converter having means for applying said converted frequencies along with the clearance carrier frequencies within said receiver thereby to provide the ILS indicators with over-riding signals.

* * * * *